United States Patent [19]

Brugliera et al.

[11] Patent Number: 4,910,767
[45] Date of Patent: Mar. 20, 1990

[54] ANI AUTO DIALER WITH CARRIER CURRENT INTERFACE

[75] Inventors: Vito Brugliera, Evanston, Ill.; Barry Hardek, Windham, N.H.; Michael E. Long, Oak Brook; Paul A. Snopko, Chicago, both of Ill.

[73] Assignee: Zenith Electronics Corporation, Glenview, Ill.

[21] Appl. No.: 275,981

[22] Filed: Jan. 3, 1989

[51] Int. Cl.⁴ ............... H04M 11/00; H04N 7/10; H04N 7/173
[52] U.S. Cl. ............................ 379/355; 358/86
[58] Field of Search ............... 358/84, 85, 86; 379/91, 379/92, 216, 355; 380/16, 20; 455/2, 4, 5

[56] References Cited

U.S. PATENT DOCUMENTS

| 4,456,925 | 6/1984 | Skerlos et al. | 358/85 |
| 4,630,108 | 12/1986 | Gomersall | 358/84 |
| 4,710,955 | 12/1987 | Kauffman | 358/84 X |
| 4,807,023 | 2/1989 | Bestler et al. | 358/86 |

FOREIGN PATENT DOCUMENTS

85/03830 8/1985 PCT Int'l Appl. ............ 380/20

OTHER PUBLICATIONS

Sirazi et al., "Comparative Study of Hybrid IPPV Implementations", presented at Cable 85, Las Vegas, Nev. (Jun. 3, 1985).

Primary Examiner—Keith E. George

[57] ABSTRACT

One version of a microprocessor based auto dialer for a PPV television system includes an IR receiver for receiving impulse "buy" decisions, in the form of one or more key pad entries from a portable IR transmitter, and a number generator for adding the appropriate digits to a partial ANI telephone number stored in memory. In another version, the auto dialer is connected to the serial port of a PM type CATV decoder and a PPV identifier and telephone number may be downloaded to the ANI auto dialer to eliminate the permanent storage of the telephone number and to simplify subscriber interaction. The auto dialer dials the telephone number of the cable head end. Further embodiments include carrier current interfaces between the IR receiver/detector and the auto dialer, and between the decoder and the auto dialer.

10 Claims, 4 Drawing Sheets

ANI AUTO DIALER WITH CARRIER CURRENT INTERFACE

BACKGROUND OF THE INVENTION

This invention relates generally to impulse pay-per-view (PPV) television systems and especially to such systems wherein a subscriber requests authorization to receive a particular scrambled PPV television program by placing a telephone call. The telephone call initiates a transaction that ultimately allows the subscriber terminal device (usually an addressable cable decoder) to unscramble a television signal at the desired time. In practice, a number of head end telephone numbers are used to identify various PPV programs, with the numbers being changed periodically so that at a particular time on a particular date a specific PPV program is identified with a specific telephone number.

The program selection mechanism uses automatic number identification (ANI) technology that is available within the telephone switching network. ANI equipment interfaces with the local network and may be provided by the local telephone company, a long distance carrier or an interexchange carrier. The ANI equipment may be installed at the local network switching office or may be "off site" if operated by a third party. The telephone number identifying the PPV program is referred to as the called number and the subscriber telephone number is referred to as the calling number. The ANI equipment intercepts the transaction-originating telephone call by recognizing the called number as other than a voice network number. (Interception by the ANI equipment results in the call being outside the voice network and not adding any load thereto.) The ANI equipment transforms the telephone call into a data packet containing the called number, the calling number nd a television system identifier. The data packet is transmitted over different communication links, i.e. a telephone modem, via satellite or other telephone networks, to either a system controller or to a management computer. A system controller is located at the cable head end and is used to address the individual home terminal identified with the calling number. A management computer is used to drive a system controller for other applications. For the purposes of this invention, it is immaterial whether the ANI data packet goes to a system controller or to a management computer.

Presently, a subscriber in such a system must actually dial the appropriate head end telephone number on a telephone. This transaction is colloquially referred to as "buying" or "purchasing" a program or event. There are two impediments associated with this: one is that the telephone number generally changes from event to event, making it difficult to remember the correct number; the other is that the telephone instrument may not be conveniently located for the subscriber. Such impediments are undesirable since they impede the subscriber from implementing the buy decision and detract from the impulse nature of the system.

Accordingly, there is a need in the art for a system to facilitate subscriber implementation of impulse purchase decisions of PPV television programs.

One solution of the invention provides the subscriber with an auto dialer system for automatically dialing the head end telephone number. Such an auto dialer system includes:

1. A handheld IR transmitter (may already be present if the subscriber has an addressable cable converter).
2. An IR receiver that responds to the IR signals from the transmitter.
3. A memory in which a portion of the head end telephone number digits (N) used for PPV are stored, in the form of NNN-XXXX with the number of N's and X's determined by the needs of the CATV system.
4. Digital and analog circuits to respond to the output of the IR receiver to provide a number of digits (X) to be appended to the numbers stored in the memory.
5. Circuitry to determine if the sequence is correct by testing for the number of digits, their timing, whether the telephone circuit is in use and for repetitively dialing the head end telephone number until the call is answered.

In this form, the auto dialer system is separate from the decoder and therefore useful with any CATV decoder. The area code and first group of digits of the CATV system's ANI telephone number block could be preprogrammed into the auto dialer (for example, with hidden DIP switches or in a PROM). An IR receiver is included in the auto dialer to receive the authorization (buy) request from the subscriber. To order a program, the subscriber enters a small number, two digits for example, which is added to the preprogrammed ANI phone number associated with the PPV program, and a single data entry (DE) command on his handheld IR transmitter. A microprocessor in the auto dialer system adds the digits entered to the end of the preprogrammed base ANI phone number and automatically makes the telephone call to complete the transaction.

In another form, the system of the invention is particularly useful with Zenith Electronics Corporation's PM cable system which has a serial output port and the ability to be downloaded with data from the cable head end. In this aspect of the invention, the microprocessor-based auto dialer is coupled to the PM serial port and ANI dialing performed after receipt of a very limited number of digits entered by the subscriber to indicate his impulse buy decision. Apart from a register for storing the telephone number during the dialing phase of operation, the auto dialer system need have no number memory. Optionally, partial numbers may be stored, as in the above system, and only the remainder of the digits (or a code indicating the digits) downloaded from the head end.

In practice, the auto dialer may be initialized by the head end by being downloaded with a number of ANI phone numbers (up to 100 in a two digit program tag system). In this instance, the phone numbers would be identified as 0-99 to correspond to the program tags applied by the head end to the particular program events. The program tag would be downloaded periodically by global pass commands from the head end to all subscribers and the subscriber would only need to push the single DE button on the remote control transmitter in order to buy the program to which he is tuned. The auto dialer would receive the IR signal from the PM decoder and recognize the event number, either because it is entered by the subscriber via the remote keyboard or because it corresponds to a program tag. The auto dialer then selects the telephone number to be dialed that corresponds to the event number in its previously downloaded memory. Thereafter, the auto dialer continues dialling until a connection is made to the head end telephone terminal.

Both of the above described systems require that the auto dialer and the decoder be positioned in proximity to a telephone jack. This may not always be possible since the decoder is generally located adjacent to the subscriber's television receiver and there may not be a nearby telephone jack. In accordance with a further aspect of the invention, a remote communications link is provided between the IR receiver/detector or the decoder output, as the case may be, and the auto dialer input to permit the auto dialer to be in a different portion of the household. In accordance with the preferred embodiment of the invention, a line carrier communication link is provided in which the common house circuit wiring is used to carry the signals from the output of the decoder or IR receiver/detector to the input of the auto dialer for executing the subscriber's purchase decision. The separate communication link may be RF or infrared also and is useful with both of the abovementioned versions of the invention.

OBJECTS OF THE INVENTION

A principal object of the invention is to provide a novel impulse pay per view television system.

Another object of the invention is to provide a pay per view television system that requires minimal activity on the part of the subscriber.

A further object of the invention is to provide a novel arrangement for exercising a buy decision in an impulse pay per view television system.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

U.S. Pat. No. 4,467,353 entitled TELEVISION SIGNAL SCRAMBLING SYSTEM AND METHOD and U.S. Pat. No. 4,771,458 entitled SECURE DATA PACKET TRANSMISSION SYSTEM AND METHOD and application Ser. No. 126,452, filed 11/30/87 entitled PAY PER VIEW TELEVISION SIGNALLING METHOD, all of which are assigned to Zenith Electronics Corporation and all of which are hereby incorporated by reference, generally describe the Zenith Electronics Corporation PM (phase modulation) CATV system. That system downloads data from the cable head end to individual subscribers by utilizing the width of the horizontal interval to indicate a data bit and incorporates scrambling techniques, in conjunction with global and address data packets, for communicating with and controlling operation of subscriber decoders. The copending application describes a relatively simple impulse pay per view system utilizing an arrangement of program tags and default keys. While the present invention is usable in a PM system, it is also usable with any conventional CATV decoder.

Figure 1:
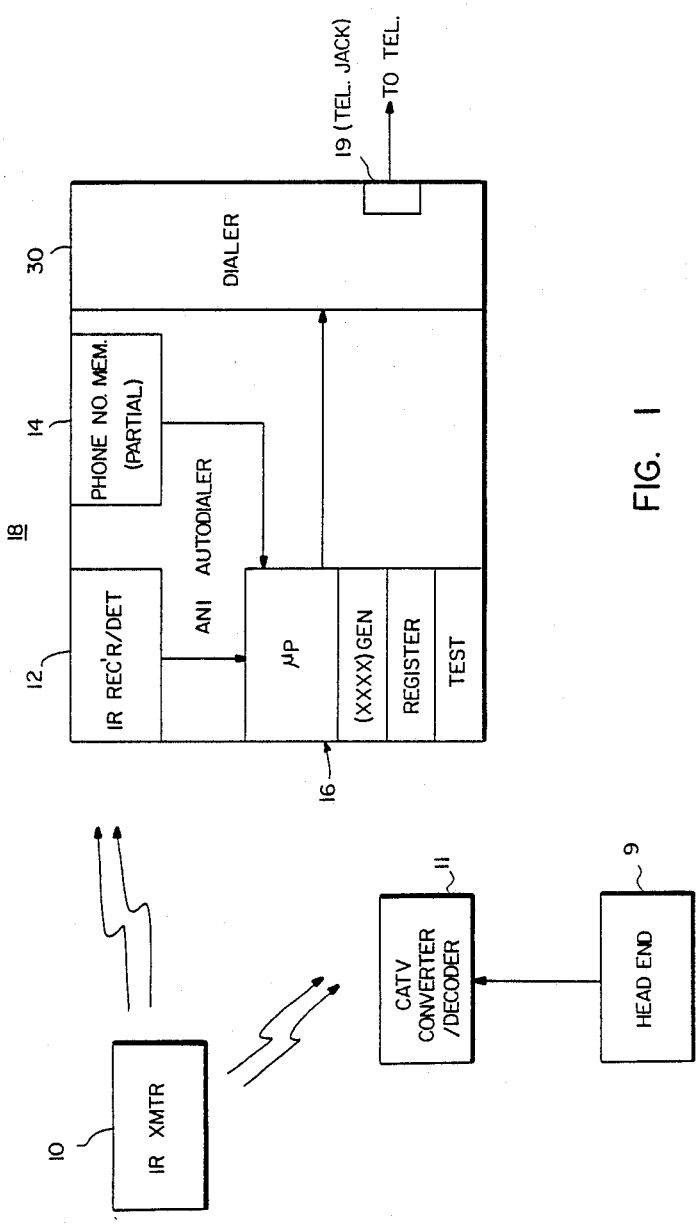
FIG. 1 is a block diagram showing one aspect of the invention.

Referring to FIG. 1, an IR transmitter 10, which can be the same IR transmitter used to control a subscriber's CATV converter/decoder 11 supplies control signals that are received by an IR receiver/detector 12 that is housed in an ANI auto dialer 18. A cable head end 9 supplies signals to decoder 11. The output of the receiver/detector 12 is supplied to a microprocessor 16 for generating a number of digits (X) to be appended to an ANI partial telephone number stored in a telephone number memory 14 (which may be a PROM). Microprocessor 16 also performs test functions for validating the number of digits received from the IR receiver/detector 12 and for determining when the telephone line is free, and the like. Microprocessor 16 reads the digits sent via the IR code from the IR receiver/detector 12 and the telephone number memory 14 and adds the IR transmitted digits as a suffix to the telephone number digits. The complete number is placed in a register and a dialer 30 is accessed to dial the telephone number. Dialer 30 includes well known means for accessing a telephone line via a telephone jack 19 and for generating signals corresponding to the telephone number supplied by microprocessor 16. In this manner, the particular digits transmitted in coded command form by IR transmitter 10 are appended to the stored digits in the telephone number memory for the ANI dialer.

Thus, for example, the cable head end telephone number, consisting of the area code and the base digits in a telephone number block is combined with the digits dictated by the transmitted signals. These digits are generated by microprocessor 16 and appended to the portion of the cable head end telephone number that is stored to produce the entire telephone number. It will be appreciated that the X's before the word GEN in microprocessor 16 indicate the number of digits and that the number of digits used is a function of the cable system. For example, as described above, only two digits are needed to provide 100 program tags for pay events. In such case, the block of telephone numbers for the cable head end would terminate in the digits 00 through 99.

Figure 2:
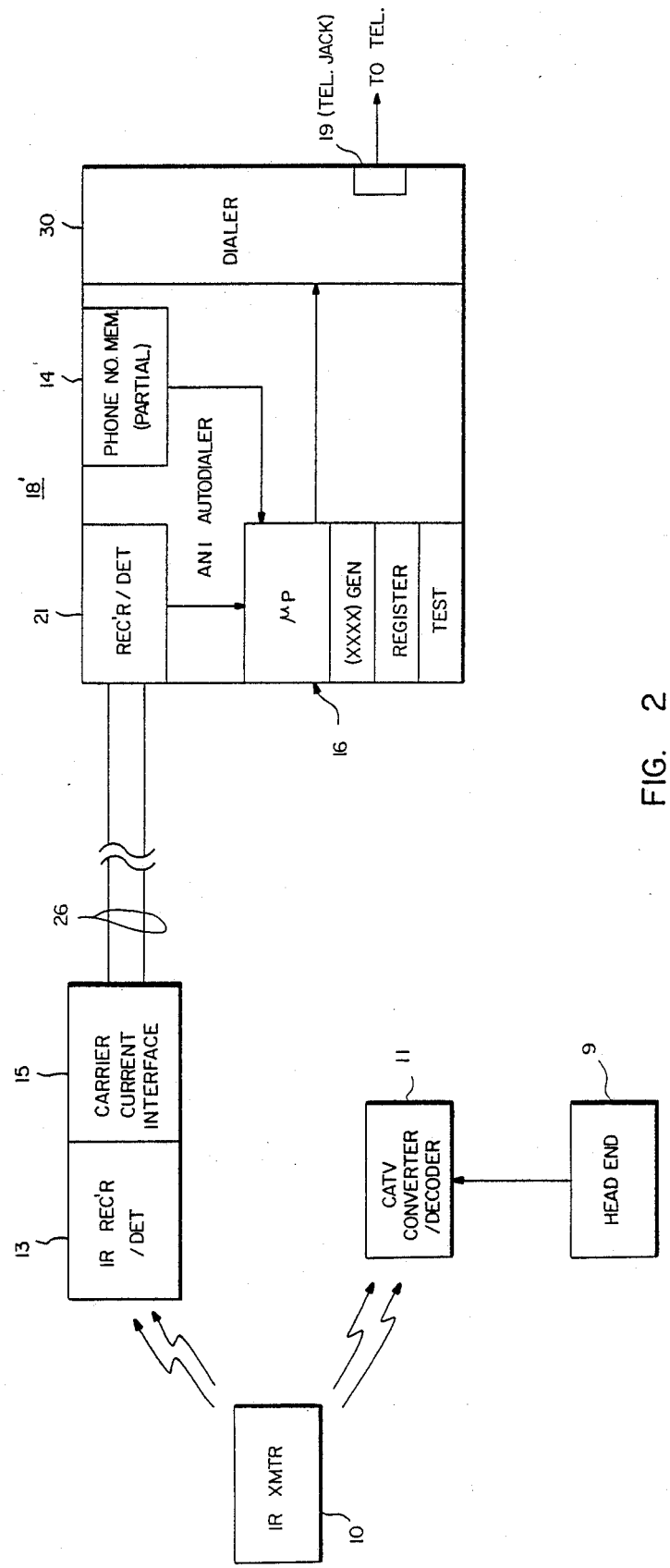
FIG. 2 is a block diagram showing another aspect of the invention of FIG. 1 with a separate communications link.

In FIG. 2, another version of the invention of FIG. 1 is illustrated in which a communications link, in the form of a carrier current interface is incorporated. Transmitter 10 sends coded IR signals to an IR receiver/detector 13 that is coupled to a carrier current interface 15. Carrier current interface 15 generates a carrier current that is modulated by the data from IR receiver/detector 13 and applies it to the AC house wiring, generally indicated as 26. The ANI auto dialer 18' includes a suitable receiver/detector 21 for receiving and demodulating the carrier current signal on the AC house wiring 26. In all other respects, operation is the same as that described for FIG. 1. The advantage is, of course, that there is no need for the telephone jack 19 to be close to the IR receiver/detector 13 or to the CATV converter 11. As mentioned previously, while the preferred implementation has a carrier current interface, an IR or RF interface is also contemplated.

Figure 3:
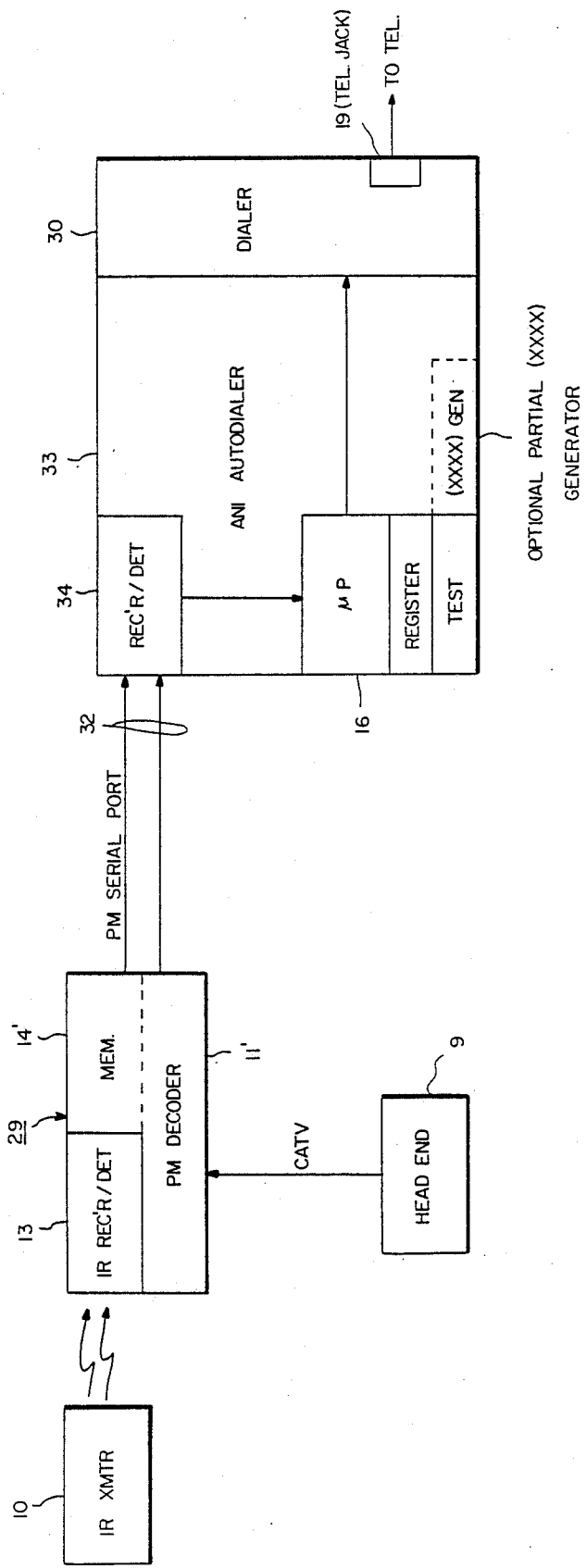
FIG. 3 is a block diagram of a different aspect of the invention.

In FIG. 3, IR transmitter 10 supplies coded IR signals to an IR receiver/detector 13 that is included in a cable converter arrangement 29. Cable converter arrangement 29 includes a PM type decoder 11' having a serial port 32 over which data is transmitted to an ANI auto dialer arrangement 33. The PM decoder also includes a memory for storing authorization codes and other data. Specifically, auto dialer arrangement 33 includes a receiver/detector 34 for accepting the data transmitted via the serial port 32 of PM decoder 11' and for applying the information to microprocessor 16 for controlling application of telephone numbers to diler 30. The major difference in this version of the invention is that the telephone number of the PPV program may be downloaded to PM decoder 11' from the cable head end and transmitted via the serial port 32 of PM decoder 11' to the auto dialer arrangement 33. This eliminates the need for storing digits, or portions of the head end telephone number, in the auto dialer arrangement and also simplifies the entry on the IR transmitter required of the subscriber to buy a program. While the specific arrangement may be modified to suit the needs of the cable head end, in the embodiment of FIG. 3, the subscriber need only depress a single key on his handheld transmitter 10 to make a purchase decision. This is because the data received by PM decoder 11' will include a program identifier and telephone number which is passed through the PM decoder serial port to the ANI auto dialer arrangement 33, which then decides the number to dial based upon the downloaded data. It will be appreciated that the system may have portions of the telephone number stored in the ANI auto dialer arrangement as described above for FIGS. 1 and 2 and require entry of one or more digits from the subscriber in order to purchase a program based upon the particular cable system.

Figure 4:
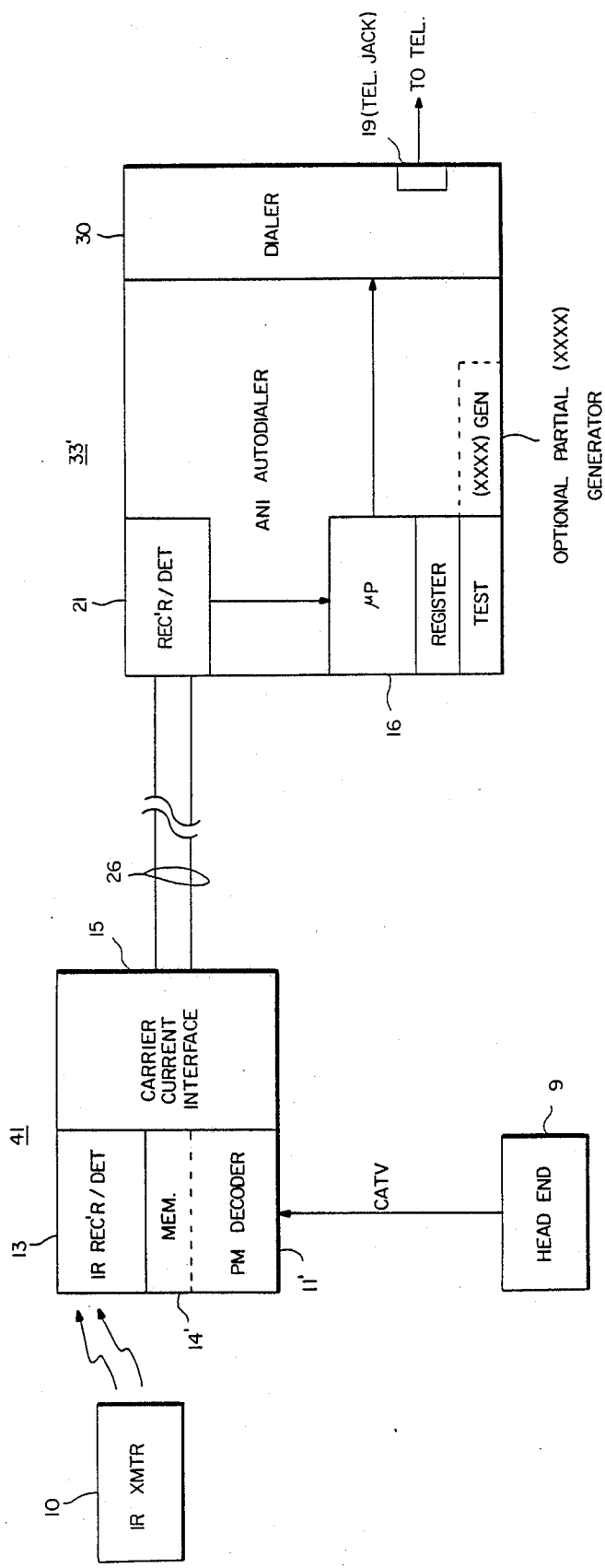
FIG. 4 is a block diagram of the invention of FIG. 3 with a separate communications link.

In FIG. 4, the inventive arrangement illustrated in FIG. 3 is shown with a communications interface for operating a system where the telephone jack is not conveniently located to the decoder. In FIG. 4, the cable converter arrangement 41 includes PM decoder 11' and IR receiver/detector 13 as in FIG. 3, but also includes a carrier current interface 15 that processes the received data from the PM decoder and IR receiver/detector and sends it as carrier modulation along the power line link 26 where it is received by an appropriate receiver/detector 21 in ANI auto dialer arrangement 33'. In all other respects, the arrangement of FIG. 4 is identical to that of FIG. 3. As will be apparent, the advantages of the FIGS. 3 and 4 implementation is in the downloading of data directly from the cable head end which not only minimizes the cost of the ANI auto dialer mechanism, but also provides greater flexibility to the cable head end. Lastly, the subscriber need only enter a single push button entry on his handheld control unit to make an impulse buy decision.

With the inventive arrangements, the constraints on an impulse pay television system are significantly minimized since the subscriber need not have direct access to a telephone and need not dial telephone numbers. It is recognized that numerous modifications and changes to the described embodiment of the invention will be apparent to those skilled in the art without departing from its true spirit and scope. The invention is to be limited only as defined in the claims.

What is claimed is:

1. An impulse pay per view television receiver system for communicating with a head end via a telephone comprising:
   a telephone terminal located at a subscriber site;
   memory means at said subscriber site for permanently storing a portion of a head end telephone number;
   auto dialer means coupled between said memory means and said subscriber site telephone terminal;
   means for signalling said auto dialer means to dial said head end telephone number to authorize receipt of a pay television program at said subscriber site, said signalling means providing the remaining portion of said head end telephone number; and
   signal receiving means coupled to said auto dialer means fior receiving said signal and causing said auto dialer means to dial said head end telephone number.

2. The system of claim 1 wherein said signalling means is a portable IR transmitter and said signal receiving means is an IR receiver/detector.

3. The system of claim 3, further including a communications link interconnecting said IR receiver/detector with said auto dialer means.

4. The system of claim 3 wherein said communications link comprises a carrier current interface means and a carrier current receiver means coupled via a common house wiring circuit.

5. An impulse pay per view television receiver system for communicating with a head end via a telephone comprising:
   a telephone terminal located at a subscriber site;
   memory means at said subscriber site for storing a head end telephone number;
   auto dialer means coupled between said memory means and said subscriber site telephone terminal;
   means for signalling said auto dialer means to dial said head end telephone number to authorize receipt of a pay television program at said subscriber site;
   signal receiving means coupled to said auto dialer means for receiving said signal and causing said auto dialer means to dial said head end telephone number;
   a decoder means for receiving downloaded data from the head end, including a program identifier and at least a portion of said head end telephone number; and
   means for supplying said program identifier and at least said portion of said head end telephone number to said auto dialer means in response to said signalling means.

6. The system of claim 5 wherein said signalling means is an IR transmitter and said signal receiving means is an IR receiver/detector.

7. The system of claim 6, further including a communications link interconnecting said IR receiver/detector with said auto dialer means.

8. The system of claim 7 wherein said communications link comprises a carrier current interface means and a carrier current receiver means coupled via a common house wiring circuit.

9. An impulse pay-per-view television receiving system for communicating with a head end via a telephone number comprising:
   decoder means, including an IR receiver/detector, and a telephone terminal located at a subscriber site;
   memory means at said subscriber site for storing a head end telephone number;
   auto dialer means coupled between said memory means and said telephone terminal;
   microprocessor means for controlling said memory means and said auto dialer means;
   said decoder means having a port for passing downloaded data from said head end to said microprocessor means, said downloaded data including a program identifier and at least a portion of said head end telephone number; and
   signalling means including a portable IR transmitter for signalling said auto dialer means to dial said head end telephone number to request authorization to receive and decode a pay television program.

10. The system of claim 9, further including a carrier current communications link interconnecting said decoder means and said microprocessor means.

* * * * *